United States Patent [19]

Findlanl et al.

[11] Patent Number: 5,060,374
[45] Date of Patent: Oct. 29, 1991

[54] METHOD FOR FABRICATING A VALVE

[75] Inventors: Shane J. Findlanl, Concord; William F. Newell, Jr., Mooresville, both of N.C.

[73] Assignee: Electric Power Research Institute, Inc., Palo Alto, Calif.

[21] Appl. No.: 361,492

[22] Filed: Jun. 5, 1989

[51] Int. Cl.⁵ .............................................. B21D 53/00
[52] U.S. Cl. .............................. 29/888.44; 29/890.128; 29/890.129
[58] Field of Search ...................... 29/890.124, 888.44, 29/890.128, 890.129, 890.131; 251/328, 359, 360; 123/188 S, 188 P, 188 R

[56] References Cited

U.S. PATENT DOCUMENTS

| | | | |
|---|---|---|---|
| 1,987,784 | 1/1935 | McDonald | 29/888.44 |
| 2,056,160 | 10/1936 | Allen | 123/188.5 |
| 2,753,859 | 7/1956 | Bartlett | 29/890.122 |
| 3,487,823 | 1/1970 | Tarter et al. | 251/359 |
| 3,795,511 | 3/1974 | Itaruniimi et al. | 29/888.44 |
| 4,346,684 | 8/1982 | Vossieck | 29/888.44 |
| 4,424,953 | 1/1984 | Takagi et al. | 251/359 |
| 4,509,722 | 4/1985 | Ebihara | 29/888.44 |
| 4,531,273 | 7/1985 | Smith et al. | 29/890.122 |
| 4,599,110 | 7/1986 | Köhler et al. | 29/888.44 |
| 4,763,876 | 8/1988 | Oda et al. | 251/359 |

Primary Examiner—Irene Cuda
Attorney, Agent, or Firm—James B. Hinson

[57] ABSTRACT

A method for fabricating a valve includes hardened valve seats and a conventional valve stem which mates with the hardened valve seat. A valve seat support ring is attached to the body of the valve and to the hardened valve seat. HIP bonding is utilized to bond the hardened valve seat to the valve seat support ring. Conventional techniques, such as welding are used to attach the valve seat support ring to the body of the valve.

6 Claims, 2 Drawing Sheets

METHOD FOR FABRICATING A VALVE

BACKGROUND OF THE INVENTION

1. Field of the Invention

The invention relates to valves and more particularly to improved methods for fabrication of valves and valve seats.

2. Description of the Prior Art

Valves are widely used to control the flow of liquids. Typical prior art valves have diameters ranging from fractions of inches to two to three feet. Valves in the various size categories present unique assembly and repair problems. For example, relatively small valves may be easily removed from service and replaced rather than repaired. By contrast, large valves, such as those typically used in nuclear reactor feed water and steam systems are typically constructed using exotic materials such as stainless steel and are welded to associated equipment, such as pipes. Hardened valve seats are necessary in such uses. Under such circumstances repairing a faulty valve seat is a time consuming, expensive and sometimes hazardous feat. For example, typical techniques for applying hard surfacing material to surfaces as part of either a production or a repair process requires complicated equipment which is difficult to use outside the factory environment. These characteristics of prior art technology make it necessary to remove the valve from service in order to effectuate repairs or utilize an expensive and complicated repair technique.

Some materials which have characteristics which are desirable for valve seats also have characteristics making preformed valve seats made of these materials difficult to install or remove from valves. For example, preformed ceramic valve seats are not readily attachable to the body of a valve by fusion processes, such as conventional welding. Attempts to weld a preformed ceramic valve seat in place often destroys the valve seat by cracking. A threaded preformed ceramic valve seat is brittle and often breaks. Additionally, processes used to form layers of ceramic materials on the body of valves using fusion processes (such as welding) which can be machined with the valve attached to associated equipment to produce suitable valve seats are complicated and expensive. These characteristics of prior art techniques for producing valves having hardened valve seats and for repairing such valves are essentially incompatible with the need for a reliable and low cost valve seat which is easy to replace for purposes of repairing the valve. Other hard materials useful for valve seats have similar problems.

The invention which is the subject matter of this invention substantially reduces the above discussed problems with prior art valves utilizing hardened valve seats and repair processes for such valves. More specifically, the invention provides a preformed valve seat insert which is easily installed, easily removed and easily replaced to effectuate repairs and includes a hardened valve seat.

SUMMARY OF THE INVENTION

The present invention provides a method for producing an improved valve and a method for producing a hardened valve seat. More specifically, the preferred embodiment of the invention provides an improved method for producing a valve utilizing a valve seat insert which includes a hardened valve seat bonded to a metal support ring. The material for the valve seat is selected for durability and the material for the support ring is selected to assure ease of installation of the valve seat insert (mechanical and metallurgical compatibility with the valve body). The valve seat is attached to the support ring by HIP bonding.

Any two materials which have the desired properties and can be bonded together and contoured or machined into the required shape may be utilized in producing the valve seat insert. The valve seat insert is positioned in a valve seat insert receptacle in the body of the valve. The valve seat insert is attached to the valve body using conventional bonding techniques such as welding or brazing. Alternatively, the outer surface of the valve seat insert may be threaded to mate with a similar threaded interior surface of the valve seat insert receptacle. These alternate techniques for attaching the valve seat insert to the valve body are possible because the material for the valve seat can be selected for its durability characteristics and the material for the support ring selected to be compatible with the installation technique to be used. These characteristics permit the valve seat insert to be installed or removed from the associated valve without detaching the valve from associated equipment and without requiring the use of complicated assembly or repair techniques.

DETAILED DESCRIPTION

Figure 1:
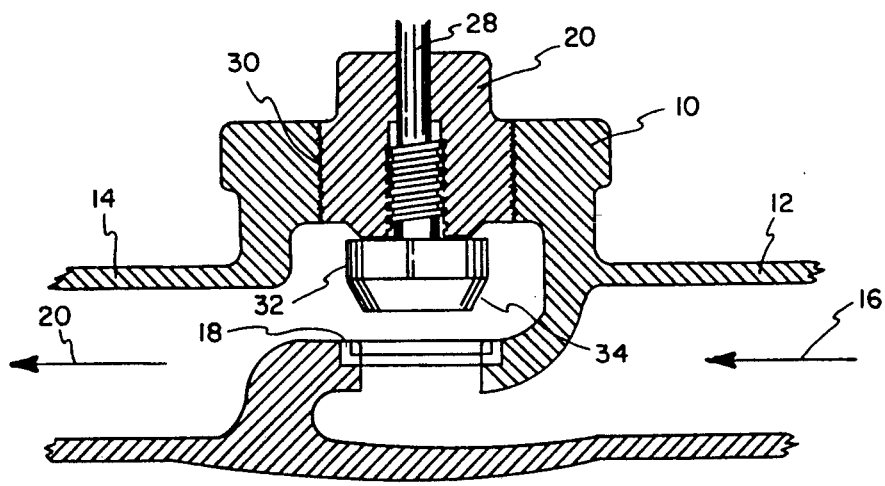
FIG. 1 is a drawing of a typical valve in accordance with the invention.

Basic geometry of typical valves are similar and essentially independent of valve size. For example, FIG. 1 illustrates a typical valve. Such valves range in size from a fraction of an inch to several feet in diameter.

More specifically, the typical valve includes a body 10, which may be conveniently formed by molding or casting. The valve body 10 includes first and second ends, 12 and 14, for attaching to the piping system used in conjunction with the valve.

In use, the liquid whose flow is to be controlled using the valve, flows into the first end 12 as generally indicated by arrow 16, through a circular opening defined by valve seat insert 18, and out the second end as indicated by arrow 20. A bonnet structure consisting of a valve stem retainer 26 and a valve stem assembly 28 is affixed to the valve 10 by suitable threading arrangement illustrated at reference numeral 30. The valve stem 28 includes a threaded portion mating with threads in the valve stem retainer 26 such that rotation of the valve stem 28 causes the valve stem 28 to move the tapered surface 34 of the valve stem causing the tapered surface 34 of the valve stem to mate with the valve seat insert 18 to shut-off the flow of liquid through the valve. Other valve stem arrangements are also usable.

Figure 2:
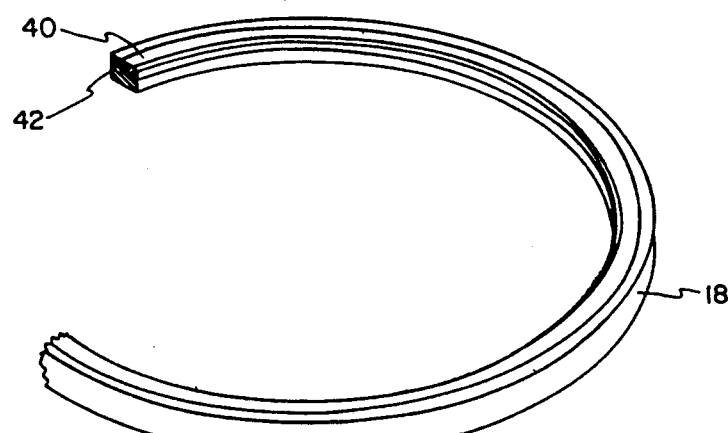
FIG. 2 is a partial isometric drawing illustrating the valve seat insert.

The valve seat insert 18 is illustrated in partial isometric view in FIG. 2. More specifically, the valve seat insert 18 includes an inner hardened valve seat 40 which is concentrically affixed to an outer support ring 42. Materials for the hardened valve seat 40 are selected to produce a valve seat having the desired durability characteristics while the materials for the support ring 42 are selected to assure easy installation of the valve seat insert 18. Stated another way, the ring 42 is made of a material which is compatible with the material utilized in producing the valve body 10.

More specifically, the valve seat 40 is preferably formed or a very hard material such as stellite while the support ring 42 is formed of a material compatible with the remainder of the valve body, such as stainless steel. Valve seats of these materials are difficult to repair using prior art techniques without removing the valve from associated equipment.

The valve seat insert, comprising an embodiment of the invention, is produced in the normal manufacturing environment which permits both components of the valve seat insert 18 to be manufactured separately and bonded together using HIP bonding processes. Such a manufacturing process is flexible permitting a wide variety of material to be used for the two components of the valve seat insert 18. These characteristics permit valve seat inserts for valves of almost any desired size to be conveniently produced and easily installed in either the factory or in the field. Suitable methods for producing the valve seat inserts subsequently described in detail.

Figure 3:
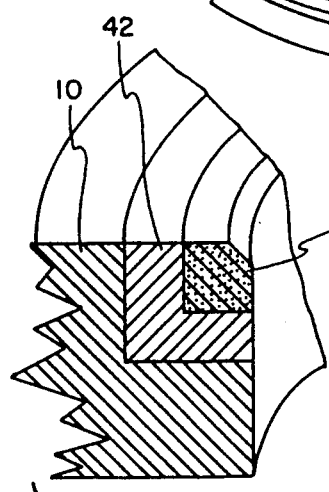
FIG. 3 is a fragmentary drawing illustrating the valve seat insert, as installed
Figure 3:
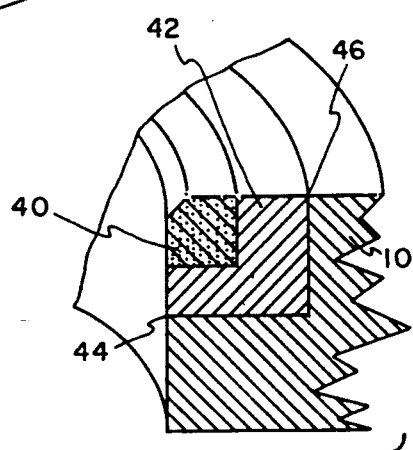

FIG. 3 is a fragmentary drawing illustrating the valve seat insert 18 as installed in the valve body 10. More specifically, the valve body 10 is machined to form a cylindrical receptacle into which the valve seat insert 18 is positioned. After the valve seat insert 18 is positioned in the receptacle, the junction between the valve body 10 and the valve seat insert 18 is seal welded along junctions illustrated at reference numerals 44 and 46. Alternatively, the valve seat insert 18 may be held in position by a suitable conventional threaded arrangement (not illustrated).

Figure 4:
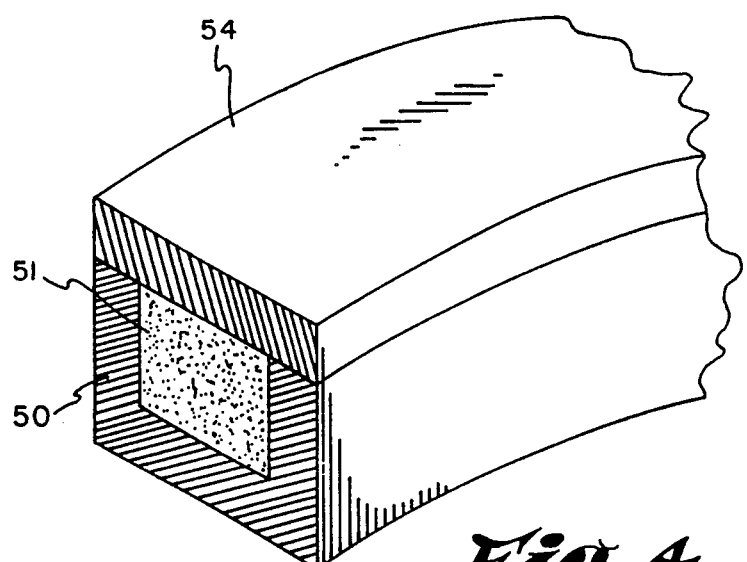
FIG. 4 is a drawing illustrating a method for forming a composite structure which is machined to form the valve seat insert.
Figure 5:
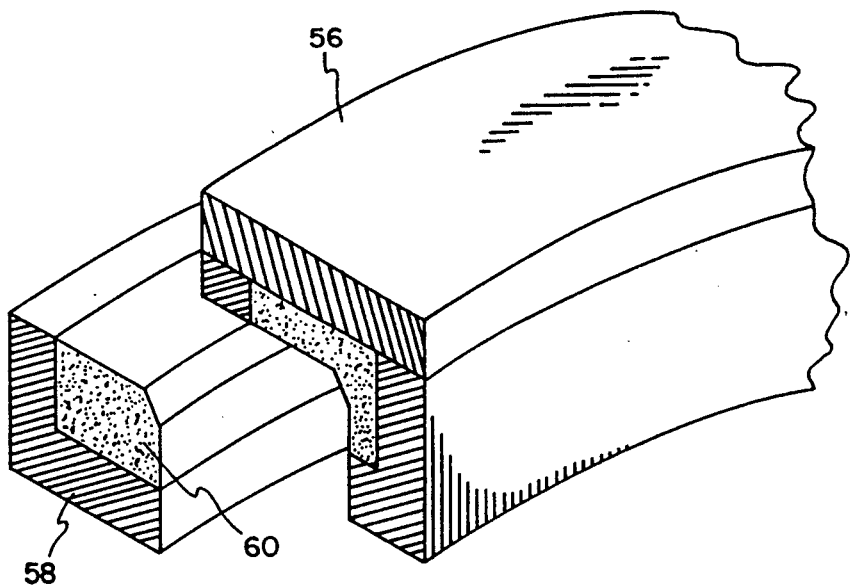
FIG. 5 is a drawing illustrating the machining of the composite structure illustrated in FIG. 4 to form a valve seat insert.

As indicated above, the valve seat insert 18 may be manufactured as two pieces and then bonded together using HIP bonding. That is to say, the valve seat 40 and the support ring 42 may be manufactured separately and bonded together. Conventional HIP bonding techniques may be utilized for this purpose. Alternatively, a composite structure which is machined to form valve seat insert 18 can be produced, as illustrated in FIGS. 4 and 5. In either case, all machining and manufacturing processes related to the valve seat insert 18 can be done before the valve seat insert 18 is installed in the valve.

In producing the composite structure which is machined to produce the valve seat insert 18, a first ring-shaped member 50 is formed of a material which is compatible with the valve body 10 and machined to form an annular groove in one surface thereof. This annular groove is filled with a powdered material 51 from which the hardened valve seat will ultimately be formed.

A second annular ring member 54 is mated with the first member 50 with the junction between these two members sealed as indicated in FIG. 4. This structure is then HIP bonded causing the powdered portion 52 to fuse forming the hard material from which the valve seat will be formed. The ring shaped members 50 and 54 also fuse together and to the fused inter portion. Conventional HIP bonding processes may be utilized for this purpose.

The bonded composite structure described above is machined, as illustrated in FIG. 5, to remove the portion of the structure generally illustrated at reference numeral 56, to leave a finished valve seat insert which includes a support ring 58 and a hardened valve seat 60. The finished valve seat insert is installed in the valve, as previously discussed and illustrated with reference to FIG. 1.

Preformed hardened valve seats and support rings may be separately produced using conventional techniques and bonded together, as illustrated in FIG. 2. Preformed hardened value seats can be mated with the support ring and bonded thereto using HIP bonding techniques. HIP bonding is especially useful for this purpose because it permits bonding together a wide variety of dissimilar materials.

We claim:

1. A method for producing a valve seat insert comprising the steps of:
   a) forming a first ring shaped member having a groove in at least one surface;
   b) positioning powdered material in said groove;
   c) mating a second ring shaped member with said first ring shaped member;
   d) attaching said first and second ring shaped members together to form a structure having an outer region surrounding said powdered material;
   e) subjecting said structure to a bonding cycle to produce a composite structure by bonding said first and second ring shaped members together to form an outer region, to fuse said powder to form an inner region of hard material, and to bond said inner and outer regions together; and
   f) removing selected portion of said composite structure to produce said valve seat insert.

2. A method for producing a valve seat insert in accordance with claim 1 further including the step of selecting said powder such that when said powder is fused an inner region composed of material suitable for use as hardened valve seats is produced.

3. A method for producing a valve seat insert in accordance with claim 2 further including the step of selecting the material for said first and second ring shaped member to produce an outer region of material suitable for attachment to the body of a valve.

4. A method for producing a valve seat insert in accordance with claim 3 wherein said material for said outer regions is suitable for attachment to the body of said valve using fusion processes.

5. A method for producing a valve seat insert in accordance with claim 4 further including the step of selecting the material for said outer region such that said valve seat insert may be attached to said valve body by brazing.

6. A method for producing a valve seat insert in accordance with claim 4 further including the step of selecting the material for said outer region such that said valve seat insert may be attached to said valve body by welding.

* * * * *